United States Patent [19]
Yuhki et al.

[11] Patent Number: 5,044,761
[45] Date of Patent: Sep. 3, 1991

[54] DISSOLVING AND DEAERATING METHOD

[75] Inventors: Hirokazu Yuhki; Sadao Kumazawa; Shigeru Yamaguchi; Hiroshi Ohnishi, all of Kanagawa, Japan

[73] Assignee: Fuji Photo Film Co., Ltd., Kanagawa, Japan

[21] Appl. No.: 539,120

[22] Filed: Jun. 18, 1990

[30] Foreign Application Priority Data

Jun. 19, 1989 [JP] Japan .................................. 1-154531

[51] Int. Cl.⁵ ............................................. B01D 19/00
[52] U.S. Cl. ...................................... 366/139; 55/38; 55/43; 55/52; 55/55; 55/190; 55/195
[58] Field of Search ................... 55/40, 43, 38, 55, 52, 55/189, 190, 195; 366/139, 163

[56] References Cited
U.S. PATENT DOCUMENTS 2,355,057  8/1944  Copeland ............................. 55/190
4,444,508  4/1984  Kreuer .................................. 366/163
4,696,684  9/1987  Shen .................................... 55/189

Primary Examiner—Bernard Nozick
Attorney, Agent, or Firm—Sughrue, Mion, Zinn, Macpeak & Seas

[57] ABSTRACT

A method of dissolving a powder material is disclosed in which the material is wholly dissolved and the existence of bubbles in the resultant solution is greatly minimized. An agitating blade stirs a liquid in an air-tight tank while the powder material is inserted into the liquid. The pressure is then reduced in the tank causing large bubbles to swell. The bubbles are destroyed by the agitating blade. The pressure reducing operation is then turned off so that the bubbles do not leave the tank through a pressure reduction port. The pressure reducing operation is then repeated a number of times to dissolve the powder material and to destroy bubbles.

8 Claims, 2 Drawing Sheets

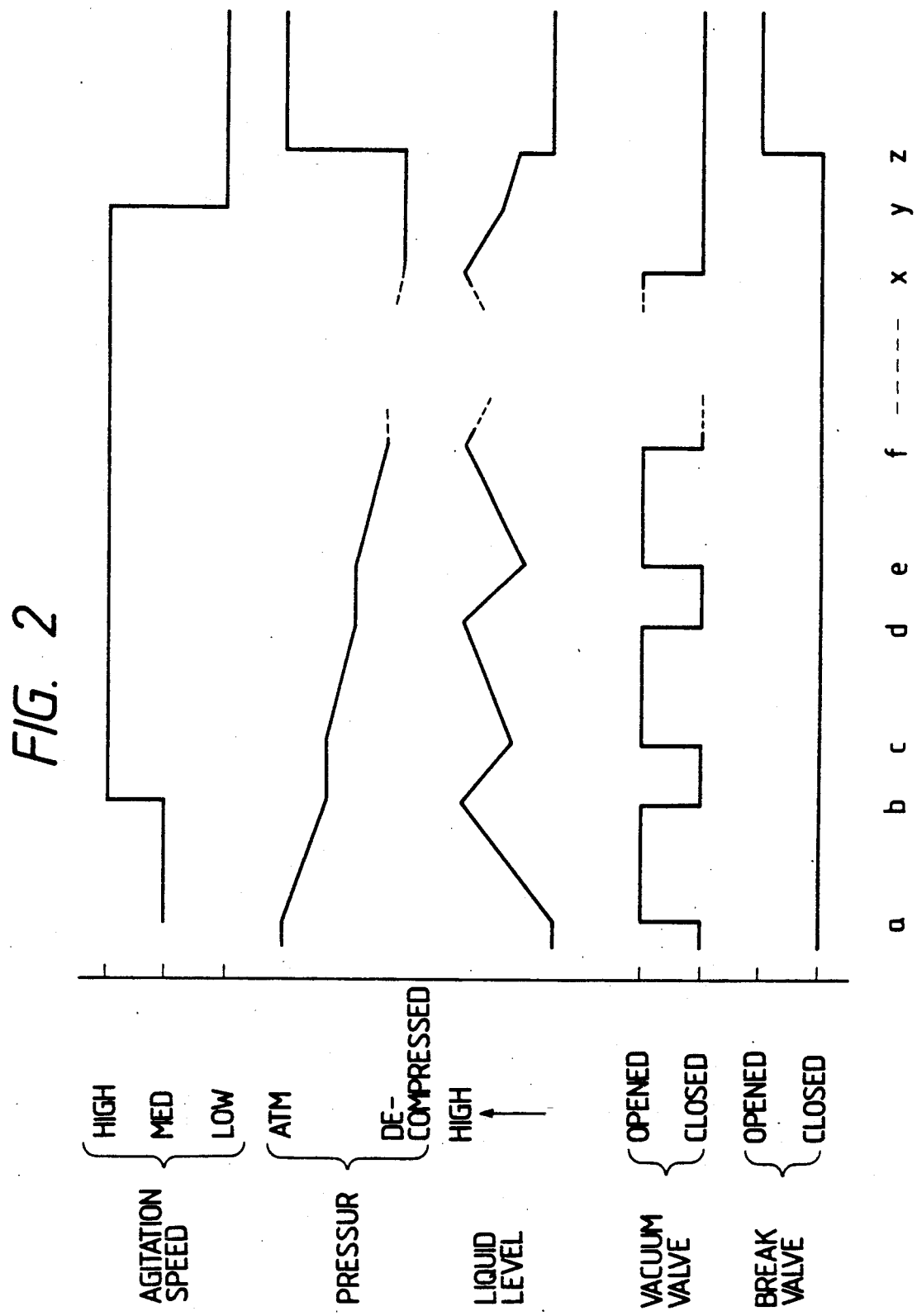

DISSOLVING AND DEAERATING METHOD

BACKGROUND OF THE INVENTION

The present invention relates to a method for dissolving a powder material in a liquid and for deaerating the thus dissolved solution, or any dissolved solution, and more particularly to a method through which the powder material that tends to develop into an undissolved agglomeration is dissolved and deaerated rapidly and easily with no bubbles being developed.

The undissolved agglomerations of the powder material are suspended in the liquid with the solution surface material which is in contact with the liquid and which forms a thin gelatinous film of high density within which the powder material remains as it is. The present invention permits not only the dissolution of such agglomerations but also the aeration or defoaming of a liquid.

Conventionally various methods have been developed to dissolve the powder material that tends to agglomerate.

One of the methods is one in which the powder material is immersed for a sufficiently long time, until the material swells adequately, in a liquid of relatively low temperatures at which the agglomerations are not likely to develop, then the liquid is heated to have the powder material dissolve in the liquid. This method requires a long time for the powder material to swell in the liquid and for heating the solution to a temperature at which the powder material begins to dissolve.

Another method is one in which the powder material is added to a liquid of a relatively low temperature at which the agglomerations are not likely to develop, then the material is sufficiently dispersed in the liquid, and finally the liquid is heated for the powder material to dissolve in the liquid while being forcibly agitated.

In this method, as soon as the powder material is introduced into the liquid, the liquid is agitated so that the powder material will not produce agglomerations and is then further agitated while the temperature of the liquid is being raised to a point at which the material starts to dissolve in the liquid.

Still another method is one in which the powder material is continuously supplied into a liquid at a constant flow rate, so that the material is evenly dispersed in the liquid. The liquid is at a relatively low temperature at which the agglomerations are not likely to develop, and then the liquid is heated under forcible agitation for continuous dissolution of the powder material.

This method requires a constant flow material-feeding apparatus and a continuously dissolving apparatus. Also, the powder material tends to be deposited on the inner wall of the conduits, thus causing a resultant difficulty in operating the two apparatuses in a steady manner.

To overcome the aforementioned drawbacks, the method disclosed in commonly assigned Japanese Patent Laid-Open No. 50-97578 was proposed. This method is one in which a liquid, into which the powder material is to be dissolved, is heated to a temperature higher than that at which the powder material starts to dissolve, and then the powder material is supplied into the liquid while the tank within which the liquid is accommodated is strongly agitated at a position near the liquid surface as well as at the bottom of the liquid, thus dissolving the powder material in the liquid.

The decompression of a tank is commonly employed when deaerating a solution in the tank. That is, the pressure in the tank is reduced to allow the bubbles in the solution to rise to the surface of the solution for vanishment.

Another way of destroying the bubbles is to introduce air or an inert gas for pressurizing the solution (Japanese Patent Publication No. 63-66564).

The above-described conventional methods of dissolving the powder material suffer from the following problems:

(1) Preparing a solution of a high concentration of powder material requires a very strong agitating power which increases the potential of introducing bubbles into the solution when stirring, and, therefore, deaeration is necessitated. The deaeration methods include deaeration by elevating the bubbles to the liquid surface and deaeration by the use of ultrasound. Either of these methods requires a long preparation time of the liquid or complex process stages; and (2) Stirring with greater power in an attempt to shorten the dissolving-time at low powder material concentrations also introduces air into the solution increasing the bubbles in the solution, thus necessitating deaeration.

Deaeration methods using only decompression of the tank suffer from the following disadvantages:

(1) The growth in volume of the bubbles in the solution due to decompression causes an increase in volume of the entire solution, thus necessitating a tank of an intolerably large size as well as placing limitations on the decompression process;

(2) Deaeration depends on the rise of the bubbles to the liquid surface; therefore, deaeration requires a long time for the bubbles to gather on the surface of the liquid so that they may be destroyed;

(3) If the viscosity of the liquid is high, the bubbles are not efficiently destroyed at the liquid surface thus causing a poor deaeration result.

SUMMARY OF THE INVENTION

An object of the present invention is to provide a method in which through the use of a simple and easy-to-use apparatus, the powder material that tends to develop into agglomerations is dissolved easily and quickly with no bubbles produced in the solution. Another object of the invention is to provide a method in which a liquid material containing bubbles is deaerated through the use of a simple and easy-to-use apparatus.

The above-mentioned objects of the invention are achieved by the following methods.

(1) A method of dissolving a powder material into a liquid using high speed agitation, in an airtight jacketed tank, and of deaerating the solution, characterized by steps of:
  supplying the powder material into the liquid;
  reducing a pressure in the tank by commencing a decompression cycle and then ending said cycle at a later time;
  starting to agitate the liquid at a high speed; and
  cycling through further decompression cycles of the tank in discrete steps for progressively lowering the pressure in the tank, while continuously agitating the liquid at the high speed.

(2) A method of deaerating a liquid, characterized by steps of:
  supplying the liquid into an air-tight jacketed tank;

reducing a pressure in the tank by commencing a decompression cycle and then ending said cycle at a later time;

starting to agitate the liquid at a high speed; and cycling through further decompression cycles in discrete steps for progressively lowering the pressure in the tank, while continuously agitating the liquid at the high speed.

In the present invention, the jacketed tank is used for maintaining the solution at temperatures higher than those at which the powder material can be dissolved in the liquid, but the application of the present invention is not limited to high-temperature solutions or low-temperature solutions.

In the present invention, the sequence in which the various processes are performed is extremely important. The agitation of the liquid prior to the high speed agitation should be carried out at low or medium speeds so that air is not introduced by the agitating blade into the liquid during the supply of the powder material into the liquid. The agitation speed is then switched to higher values after the pressure in the tank is reduced to a certain level to destroy large bubbles resulting from the decompression operation.

The decompression is stopped so that gases contained within the liquid, which is accommodated in the tank, will not further increase in volume, thus causing a further increase in liquid level. This prevents the solution from being pumped out of the tank by the vacuum pump. During the stoppage of the reduction of pressure, the bubbles in the liquid at that time are destroyed by the high speed agitator, so that the gases in the bubbles escape into the space above the liquid surface. Then, the liquid level decreases.

When the liquid level is decreased to a predetermined level, the decompression is resumed so that gases dissolved in the solution are extracted in the form of bubbles. As soon as the liquid level rises to a certain level, the decompression is stopped to let the gases in the bubbles escape into the air above the liquid surface by destroying the bubbles through the use of the agitator. This step is repeated a certain number of times and then the tank is further decompressed to a next lower pressure level. The large bubbles are destroyed by the agitating process under reduced pressure for separation from the solution while the small bubbles are dissolved in the liquid to vanish when the pressure is returned to atmospheric pressure.

The boundary film debonding action due to the development of bubbles under reduced pressure urges the powder material to rapidly dissolve.

In the present invention, after the dissolution and deaeration has been completed at the end of the above-described operations, the rotation of the agitator is reduced to low speeds before the pressure in the tank is returned to the atmospheric pressure. The operation is performed in this sequence so that air once removed will not be introduced into the solution again. The liquids to which the present invention pertains include stock solutions for dissolving the powder material thereinto and solutions that already contain solute therein.

BRIEF DESCRIPTION OF THE DRAWINGS

FIG. 2 is a graph with the abscissa representing a time scale, and ordinates representing changes in agitation speed, pressure in the tank, liquid level of the tank, operations of a vacuum valve 7 and a break valve 14.

DETAILED DESCRIPTION OF PREFERRED EMBODIMENTS

Figure 1:
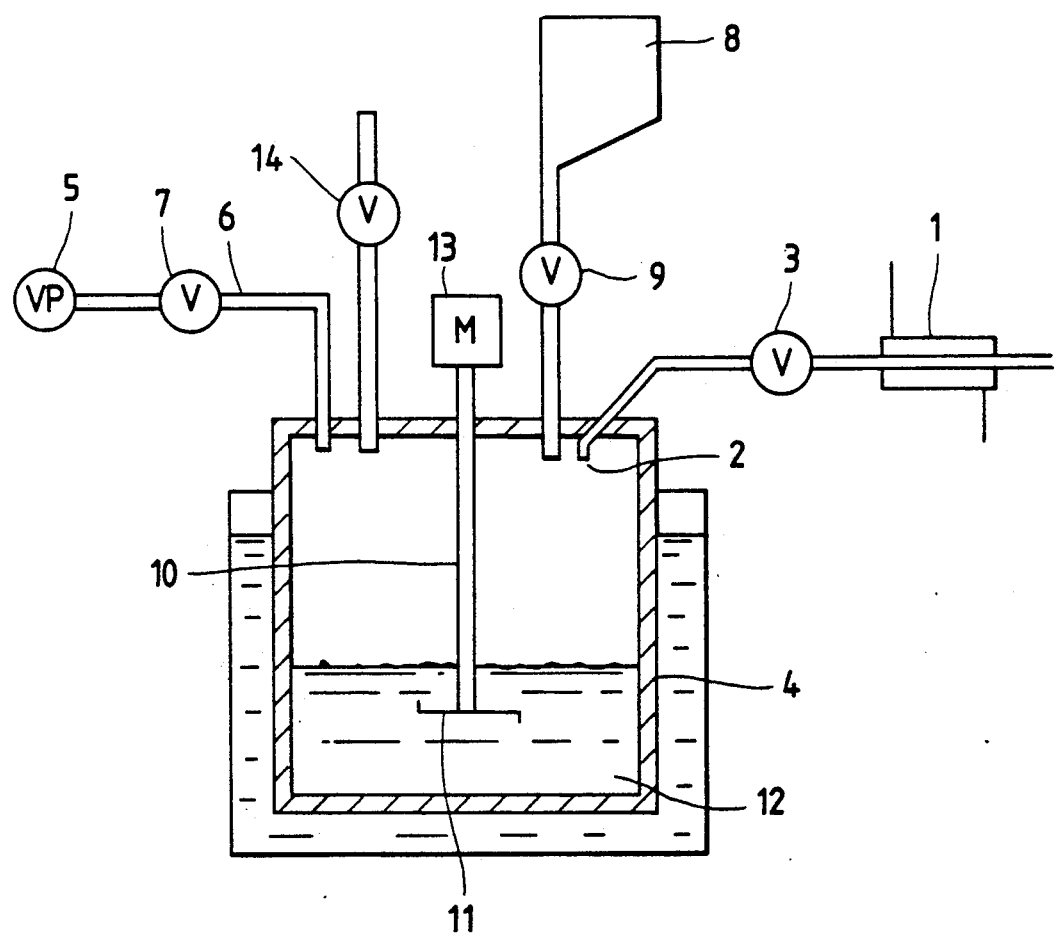
FIG. 1 is a general cross-sectional side view showing an embodiment of a dissolving and deaerating apparatus used in the invention.

Embodiments of the present invention will be described with reference to the accompanying drawings.

When a powder material is dissolved into a liquid and deaerated, the dissolving and deaerating apparatus operates as follows.

In FIG. 1, the liquid passes through a heat exchanger 1 by which the liquid is heated, and a predetermined amount of which is supplied to a jacketed-tank 4. The temperature of the liquid 12 is maintained at a required level. Then, a motor 13 is operated to drive an agitating blade 11 into rotation at low to intermediate speeds to sufficiently stir a liquid 12. Thereafter, a powder feeding valve 9 is opened to supply a predetermined amount of powder material from a powder material hopper 8 into the liquid 12. The powder material in the liquid is agitated by the agitating blade 11 to achieve a completely wetted condition. Then, a vacuum valve 7 is opened while at the same time the valves 3, 9, and 14 are closed so that a vacuum pump 5 may evacuate the tank 4 through a pressure reducing port 6. The pressure reduction causes the bubbles contained in the liquid to increase in volume; therefore, the apparent volume of the entire liquid increases accordingly. The excess decompression tends to pump out the liquid through the pressure reducing port 6; thus, the valve 7 is closed to stop the decompression when the liquid volume increases to a level just before the liquid may be sucked into the pressure reducing port 6.

Then, the motor 13 is switched to the high speed for the high speed operation of the agitating blade 11. Due to the high speed operation of the agitating blade 11, a turbulent flow of the liquid results as well as a cavitation action destroying the bubbles in the liquid to thereby gradually decrease the volume of the liquid. When the liquid level is reduced to a predetermined level or when a predetermined length of time has elapsed after the motor 13 is switched to the high speed operation, the vacuum valve 7 is opened to resume the decompression.

For the second decompression onward, with the motor 13 operating at the high speed, the vacuum valve 7 is closed to stop the decompression when the liquid volume increases to a level just before the liquid is sucked into the pressure reducing port 6. Then, the next decompressing operation is performed a predetermined length of time after the second decompression or when the liquid level decreases to a predetermined level. In this manner, repeating the pressure-reducing operation permits progressive decreases in the pressure in the system.

The growth of the bubbles due to the decompression operation causes the film boundary formed by the highly concentrated dissolved solution, which exists around the powder material, to come away from the powder material, thus urging the dissolution of the powder material.

After a predetermined number of on and off operations of decompression, the motor is switched to a low speed operation and then the break valve 14 for decompression is opened to set the tank 4 to the atmospheric pressure. Thereby, microscopic bubbles contained in the system vanish during the dissolution and large bubbles are destroyed due to a rapid change in pressure. The reason why the motor is first switched to the low speed operation is that if the high speed agitation is performed after the pressure in the tank is returned to the atmospheric pressure, the bubbles would be supplied into the solution again.

FIG. 2 illustrates, with its abscissa representing a time scale, changes of the agitation speed after the decompression is begun, the pressure in the tank, the liquid level in the tank, the operation of the vacuum valve 7 and the break valve 14.

Point indicates the time at which the decompression is begun, point b the time at which the first decompression is stopped, point c the time at which the second decompression is begun, point d the time at which the second decompression is stopped, point e the time at which the third decompression is begun, point f the time at which the third decompression is stopped, point y the time at which the agitation is switched to the low speed operation, and point z the time at which the decompression is terminated to set the pressure of the system to the atmospheric pressure.

When a liquid material is only to be deaerated, that is, for situations where it is not necessary to also dissolve a material in a liquid, the apparatus operates as follows:

In FIG. 1, the liquid is supplied through a supply port 2 to the jacketed tank 4. The supplied liquid 12 is maintained at a required temperature by the jacketed tank 4. Then, the motor 13 is operated to sufficiently agitate the liquid 12 by driving the agitating blade 11 into rotation at low to medium speeds. Then, the vacuum pump 5 is operated and then the vacuum valve 7 is opened while at the same time the valves 3, 9 and 14 are closed for decompression through the pressure reducing port 6. The bubbles contained in the liquid at the initial state increase in volume due to the decompression and the apparent volume of the entire liquid also increases accordingly. The excess decompression tends to suck the liquid into the pressure reducing port 6; thus the valve 7 is closed to stop the decompression when the liquid volume increases to a level just before the liquid is sucked into the pressure reducing port 6.

Then the motor 13 is switched to a high speed for the high speed operation of the agitating blade 11. The high speed rotation of the agitating blade results in a more turbulent flow of the liquid and also in a cavitation action due to the high speed operation of the agitating blade, thus destroying the bubbles in the liquid to gradually decrease the volume of the liquid. When the liquid level reduces to a predetermined level or a predetermined time after the motor 13 is switched to the high speed operation, the vacuum valve 7 is opened to resume the decompression.

For the second decompression onward, with the motor 13 operating at the high speed, the vacuum valve 7 is closed to stop the decompression when the liquid volume increases to a level just before the liquid is sucked into the pressure reducing port 6. Then the next decompression operation is performed a predetermined length of time after the second decompression or when the liquid level decreases to a predetermined level. In this manner, repeating the decompressing operation permits the pressure in the system to decrease progressively.

After a predetermined number of on and off operations of decompression, the motor is switched to the low speed operation and then the break valve 14 for decompression is opened to set the tank 4 to the atmospheric pressure. Thereby, microscopic bubbles residing in the system vanish during the dissolution and large bubbles are destroyed due to a rapid change in pressure. The reason why the motor is first switched to the low speed operation is that if the high speed agitation continues after the pressure in the tank is returned to the atmospheric pressure, the bubbles are introduced again into the solution.

In the dissolving and deaerating apparatus, when supplying the powder material into the liquid, a strong dispersion force is required in the vicinity of the liquid surface; therefore the agitating blade must have a strong agitating power so that a strong flow of the liquid may be developed toward the bottom of the tank 4. After the decompression has begun, a very high speed agitation that provides a large stirring force is required to develop a very turbulent flow. For this purpose, use can be made of any agitator means equipped with an agitating element that performs a dispersion action by rotating at high speeds. Such agitator means include high speed agitating elements such as a tank, a homo-mixer, a homo-blender, and a keddy-mill. In addition, an agitating element may be attached to a plurality of high speed impellers, or other types of agitator means such as ore-type, propeller type, or colloid mill type may be attached at the same time.

Methods of controlling the liquid level include one in which the bubbles that have risen to the liquid surface are detected by means of level sensors such as a conventional float type, ultrasonic type, electrostatic capacity type, and photoelectric type, and one in which the vacuum valve is opened and closed at will on a predetermined time schedule for decompression and stoppage thereof. In fact, any method of controlling the liquid level may be used.

Experimental examples of the dissolving and deaerating methods according to the present invention are described below. These examples are only exemplary.

Example No. 1

Using the apparatus in FIG. 1, gelatine was dissolved in the following manner. 35 liters of hot water which were heated by a heat exchanger to 60° C., were put into a jacketed tank. A dissolver was attached to the tank and then 15 kg of gelatine were supplied from a powder hopper 8 for 30 seconds while agitating the hot water at a speed of 1000 rpm. After one minute of agitation, the vacuum pump 5 was operated to begin the decompression of the tank. The tank was decompressed for five seconds and then the vacuum valve 7 was closed to stop the decompression while at the same time the agitating speed was increased to 3100 rpm. Thereafter, a three-minute agitation operation followed by a three-second decompression was repeated four times. At the end of the fourth cycle, the high speed agitation was carried out for two minutes then the speed was reduced to 500 rpm before a break valve 14 was opened to the atmospheric pressure. The inspection of the dissolved gelatine revealed that the liquid was dark brown, that bubbles were seldom observed, and that non-dissolved gelatine was not present.

Comparison No. 1

Gelatine was dissolved in the following manner using the same apparatus as that in FIG. 1, except for the agitator.

35 liters of hot water which were heated by the heat exchanger to 60° C., were put into the jacketed tank. A six-blade contrarotation type turbine was attached to the tank and the 15 kg of gelatine powder were supplied from the powder hopper 8 for 30 seconds while agitating the water at a speed of 124 cpm (cycles per minute). The inspection of the dissolution of gelatine revealed that the liquid was muddy due to excessive bubbles, and a large amount of non-dissolved gelatine was observed.

Comparison No. 2

Using the apparatus in FIG. 1, gelatine was dissolved in the following manner. 35 liters of hot water which were heated by the heat exchanger to 60° C., were put into the jacketed tank. A dissolver was attached to the tank and the 15 kg of gelatine were supplied from the powder hopper 8 for 30 seconds while agitating the water at a speed of 1000 rpm. Then, the agitation was carried out for 30 minutes at a speed of 3100 rpm. The inspection of the dissolution of gelatine revealed that the liquid was muddy due to excessive bubbles. The volume of the liquid in the tank became as much as 30% larger than that before agitation.

Example No. 2

Using the apparatus in FIG. 1, gelatine solution was deaerated in the following manner. 50 liters of muddy gelatine solution of 50° C. and 20% concentration containing excessive bubbles was put into the jacketed tank. A dissolver was attached to the tank and decompression was begun while agitating the solution at a speed of 500 rpm. At the end of five minutes of agitation, the vacuum valve 7 was closed to stop the decompression. The pressure in the tank reached 210 torr. Then, the agitation speed was increased to a high speed of 3100 rpm. Thereafter, a cycle of three-minute agitation followed by three-second decompression was repeated four times. The lowest pressure attained was 105 torr at the end of the fourth decompression. Thereafter, the solution was agitated at the high speed for three minutes and then the speed was decreased to 500 rpm before the leak valve 14 was opened to the atmospheric pressure. The inspection of the deaeration of gelatine solution revealed that the liquid was dark brown and the bubbles were seldom observed.

Comparison No. 3

Using the apparatus in FIG. 1, gelatine solution was deaerated in the following manner. 50 liters of muddy gelatine solution of 50° C. and 20% concentration containing excessive bubbles was put into the jacketed tank. With the agitator not operating, a five-second decompression of the tank attained a pressure in the tank as low as 210 torr just before the solution was sucked into the leak valve. The solution was, then, left as it was but no significant change in liquid level was observed. The leak valve 14 was then opened to the atmospheric pressure. The inspection of the resultant deaeration of the gelatine solution revealed that the bubbles were concentrated on the surface of the liquid and more than ½ of the entire solution was muddy.

The above described invention produces, among others, the following advantages.

(1) The present invention makes it possible to provide for a highly concentrated dissolution of a powder material without bubbles being contained therein, such a dissolution was impossible using prior art methods.

(2) A strong agitation force can be set as compared to the prior art method, permitting a much shorter dissolving time.

(3) The apparatus can be used not only for dissolving but also for deaerating.

(4) Where bubbles affect the quality of a product, the dissolution operation according to the invention does not require an additional deaeration operation as opposed to the prior art method. Thus, shorter process stages and a shorter preparation time are made possible.

What is claimed is:

1. A method of dissolving a powder material into a liquid using high speed agitation, in an air-tight jacketed tank, and a deaerating a solution of the powder material, comprising the steps of:
   supplying the power material into the liquid;
   reducing a pressure in the tank by commencing a decompression operation and then ending said operation at a later time;
   agitating the liquid at a high speed; and
   cycling through further decompression operations of the tank in discrete steps for progressively lowering the pressure in the tank, while continuously agitating the liquid at the high speed.

2. A method according to claim 1 further comprising the step of switching to a low agitation speed and allowing the pressure in the tank to attain atmospheric pressure after a predetermined number of decompression operations has occurred.

3. A method of deaerating a liquid, comprising the steps of:
   supplying the liquid into an air-tight jacketed tank;
   reducing a pressure in the tank by commencing a decompression operation and then ending said operation at a later time;
   agitating the liquid at a high speed; and
   cycling through further decompression operations of the tank in discrete steps for progressively lowering the pressure in the tank, while continuously agitating the liquid at the high speed.

4. A method according to claim 3 further comprising the step of switching to a low agitation speed and allowing the pressure in the tank to attain atmospheric pressure after a predetermined number of decompression operations has occurred.

5. A method of dissolving a powder material into a liquid using high speed agitation, in an air-tight jacketed tank, and of deaerating a solution of the powder material, comprising the steps of:
   agitating the liquid at a low or medium speed;
   supplying the powder material into the liquid;
   reducing a pressure in the tank by commencing a decompression operation and then ending said operation at a later time;
   cycling through further decompression operations of the tank in discrete steps for progressively lowering the pressure in the tank, while continuously agitating the liquid at said low or medium speed; and
   increasing said low or medium agitation speed to a high speed when the pressure in the tank is reduced to a predetermined level while continuously cycling through said further decompression operations.

6. A method according to claim 5 further comprising the step of switching to a low agitation speed and allowing the pressure in the tank to attain the atmospheric pressure after a predetermined number of decompression operations has occurred.

7. A method of deaerating a liquid, comprising the steps of:

supplying the liquid into an air-tight jacketed tank;
agitating the liquid at a low or medium speed;
reducing a pressure in the tank by commencing a decompression operation and then ending said operation at a later time;
cycling through further decompression operations of the tank in discrete steps for progressively lowering the pressure in the tank, while continuously agitating the liquid at said low or medium speed; and increasing said low or medium agitation speed to a high speed when the pressure in the tank is reduced to a predetermined level while continuously cycling through said further decompression operations.

8. A method according to claim 7 further comprising the step of switching to a low agitation speed and allowing the pressure in the tank to attain the atmospheric pressure after a predetermined number of decompression operations has occurred.

* * * * *